(12) United States Patent
Watanabe et al.

(10) Patent No.: US 9,897,199 B2
(45) Date of Patent: Feb. 20, 2018

(54) HYDRAULIC CIRCUIT FOR POWER TRANSMISSION DEVICE OF VEHICLE

(71) Applicant: TOYOTA JIDOSHA KABUSHIKI KAISHA, Toyota-shi, Aichi-ken (JP)

(72) Inventors: Yasuyuki Watanabe, Toyota (JP); Shinya Kuwabara, Toyota (JP); Yoshihiro Mizuno, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 178 days.

(21) Appl. No.: 15/026,375

(22) PCT Filed: Sep. 29, 2014

(86) PCT No.: PCT/IB2014/001931
§ 371 (c)(1),
(2) Date: Mar. 31, 2016

(87) PCT Pub. No.: WO2015/049564
PCT Pub. Date: Apr. 9, 2015

(65) Prior Publication Data
US 2016/0245399 A1    Aug. 25, 2016

(30) Foreign Application Priority Data
Oct. 4, 2013 (JP) ................................. 2013-209659

(51) Int. Cl.
*F16H 61/02* (2006.01)
*F16K 11/07* (2006.01)
*F16H 61/00* (2006.01)

(52) U.S. Cl.
CPC ..... *F16H 61/0267* (2013.01); *F16H 61/0031* (2013.01); *F16H 61/0276* (2013.01);
(Continued)

(58) Field of Classification Search
CPC ............. F16H 61/0031; F16H 61/0267; F16H 2061/0279; F16K 11/07
See application file for complete search history.

(56) References Cited

U.S. PATENT DOCUMENTS 6,527,074 B1 * 3/2003 Morishita ................ B60K 6/48
180/65.1
7,779,958 B2 * 8/2010 Kitano ..................... B60K 6/48
180/338
(Continued)

FOREIGN PATENT DOCUMENTS

DE    102007023072 A1    11/2008
JP    S59-169470 U       11/1984
(Continued)

*Primary Examiner* — Thomas E Lazo
(74) *Attorney, Agent, or Firm* — Oliff PLC

(57) ABSTRACT

A fitting clearance of a relief valve functions as an air bleeding orifice. When a discharge pressure reaches a relief pressure so that the relief valve turns into a relief state, a spool is moved so as to limit flow-out of hydraulic oil through the fitting clearance. As a result, generation of air trapping is suppressed by air bleeding function of the relief valve in a closed state. Air in a discharge oil passage is discharged quickly in the initial period of the startup of an electric oil pump, thereby improving rise-up of discharge pressure. During normal pump operation in which the relief valve is held in a relief state, pressure loss due to flow out of the hydraulic oil from the fitting clearance is suppressed and consequently, an electric oil pump having substantially the same discharge performance as conventionally can be used.

8 Claims, 11 Drawing Sheets

(52) U.S. Cl.
 CPC ........ *F16K 11/07* (2013.01); *F16H 2061/004* (2013.01); *F16H 2061/0279* (2013.01)

(56) References Cited

U.S. PATENT DOCUMENTS

| | | | |
|---|---|---|---|
| 7,946,389 B2* | 5/2011 | Kakinami | ................ F16H 57/04 123/196 R |
| 7,992,385 B2* | 8/2011 | Shimizu | ................ F16D 25/123 60/337 |
| 8,812,201 B2* | 8/2014 | Kimura | ................ F15B 21/044 137/171 |
| 8,833,335 B2* | 9/2014 | Karasawa | ................ F01M 1/02 123/196 R |
| 2013/0289840 A1 | 10/2013 | Kimura et al. | |

FOREIGN PATENT DOCUMENTS

| | | |
|---|---|---|
| JP | 2001-150967 A | 6/2001 |
| JP | 2007-113640 A | 5/2007 |
| JP | 2007-170462 A | 7/2007 |
| JP | 2012-241785 A | 12/2012 |
| WO | 2007/046509 A2 | 4/2007 |
| WO | 2012/085999 A1 | 6/2012 |

* cited by examiner

HYDRAULIC CIRCUIT FOR POWER TRANSMISSION DEVICE OF VEHICLE

BACKGROUND OF THE INVENTION

1. Field of the Invention

The present invention relates to a hydraulic circuit for a power transmission device of a vehicle and more particularly, to improvement of the hydraulic circuit in which a discharge oil passage of an oil pump thereof is provided with an air bleeding orifice.

2. Description of Related Art

There has been known a hydraulic circuit of a power transmission device for a vehicle which includes (a) an oil pump for use as a hydraulic pressure source of hydraulic oil for actuating a hydraulic actuator of the power transmission device for the vehicle and (b) an air bleeding orifice which is provided so as to communicate with the discharge oil passage of the oil pump and discharge air in the discharge oil passage. Because hydraulic oil in the power transmission device is generally used as lubricant also, air is mixed during stirring at the time of lubrication. In addition, when the hydraulic oil is returned to an oil tank and used repeatedly, air trapping occurs in an intake oil passage and the discharge oil passage in the period of pump stop. Because this can obstruct rise-up of discharge pressure (oil pressure inside the discharge oil passage) at the initial period of the pump startup, an air bleeding orifice is provided to suppress occurrence of air trapping and at the same time, allow air to be discharged quickly at the initial period of the pump startup. In case where a mechanical pump and an electric oil pump are provided as oil pumps, there is a fear that at the time of the startup of the oil pumps, the rise-up of the discharge pressure may be delayed due to air in the oil passages thereby causing a shock or the like due to the operation delay of the hydraulic actuator of the power transmission device such as a gear ratio transmission. Thus, Japanese Patent Application Publication No. 2007-113640 (JP 2007-113640 A) has proposed provision of an air bleeding orifice in the discharge oil passage of the mechanical oil pump or the discharge oil passage of the electric oil pump.

SUMMARY OF THE INVENTION

However, such provision of the air bleeding orifice in the discharge oil passage of the oil pump allows hydraulic oil to flow out from the air bleeding orifice even during normal pump operation thereby causing a pressure loss. Thus, the discharge performance of the oil pump must be increased by a corresponding amount, so that the size of the oil pump is increased, thereby deteriorating mountability and fuel efficiency and increasing manufacturing cost.

The present invention provides a pump which suppresses the pressure loss during normal pump operation in case where the air bleeding orifice is provided on the discharge oil passage of the oil pump and has substantially the same discharge performance as conventionally.

An aspect of the present invention relates to a hydraulic circuit for a power transmission device of a vehicle. The hydraulic circuit includes an oil pump, a discharge oil passage, an orifice, and an orifice switching device. The oil pump is a hydraulic pressure source of hydraulic oil. The oil pump is configured to actuate a hydraulic actuator of the power transmission device. The discharge oil passage is configured to communicate with the oil pump. The discharge oil passage includes an orifice. The orifice is configured to communicate with the discharge oil passage and discharge air in the discharge oil passage. The orifice switching device is configured to limit the discharge function of the orifice when the discharge pressure in the discharge oil passage rises and reaches a set pressure.

Because such a hydraulic circuit for the power transmission device of a vehicle includes an orifice switching device which limits the discharge function of the air bleeding orifice when the discharge pressure in the discharge oil passage reaches the predetermined set pressure, generation of air trapping is suppressed by the air bleeding orifice and at the same time, air in the discharge oil passage is discharged quickly in the initial period of the pump startup thereby improving the rise-up of the hydraulic pressure. During normal pump operation in which the discharge pressure is equal to or higher than a set pressure, the discharge function of the air bleeding orifice is limited so that pressure loss due to flow-out of hydraulic oil is suppressed, and thus, the oil pump having substantially the same discharge performance as conventionally can be used. That is, while avoiding deterioration in mountability of the electric oil pump onto a vehicle and in fuel efficiency due to an increased size thereof and increase of manufacturing cost, the rise-up performance of the discharge pressure can be improved by means of the air bleeding orifice.

In the above-described hydraulic circuit, the discharge oil passage may be provided with a relief valve including the orifice switching device. The relief valve may be configured to relieve hydraulic oil in the discharge oil passage when the discharge pressure reaches a predetermined relief pressure. The set pressure may be equal to or lower than the relief pressure.

Because the set pressure of the orifice switching device is equal to or lower than the relief pressure when the discharge oil passage is provided with the relief valve, air is discharged quickly through the air bleeding orifice in the initial period of the startup of the oil pump before the relief pressure is reached, so that the discharge pressure rises up to the relief pressure quickly. On the other hand, during the normal pump operation in which the discharge pressure reaches the relief pressure so that the relief valve is turned into the relief state, the discharge function of the air bleeding orifice is limited by the orifice switching device. As a result, pressure loss due to flow-out of hydraulic oil through the air bleeding orifice is suppressed and thus, an oil pump having substantially the same discharge performance as conventionally can be adopted.

In the above-described hydraulic circuit, the relief valve may include a valve body, a spool, and an urging member. The orifice switching device may be the spool and the urging member. The valve body may include a cylindrical hole, an intake port and a discharge port. The intake port may be provided at an end portion in the axial direction of the cylindrical hole so as to communicate the cylindrical hole with the discharge oil passage. The discharge port may be provided at an intermediate portion in the axial direction of the cylindrical hole so as to communicate with the cylindrical hole. The spool may be fitted to the cylindrical hole so as to be movable in the axial direction within the cylindrical hole in the valve body. The spool may be configured to be turned into a closed state in which the spool is pushed up to the end portion with the urging force of the urging member so as to intercept a communication between the intake port and the discharge port. The spool is configured to be turned into a relief state in which when hydraulic pressure in the discharge oil passage reaches the relief pressure, the spool is retreated to a relief position communicating the intake port with the discharge port through the cylindrical hole while resisting the urging force of the urging member. The orifice may be provided on the spool so as to discharge air from the intake port to the discharge port in the closed state. The orifice may be configured to limit discharge of air when the spool is retreated up to the relief position.

The above-described relief valve is a spool valve having the spool and the spool is provided with the air bleeding orifice. That is, the air bleeding orifice and the orifice switching device are constructed integrally with the relief valve, thereby constituting the hydraulic circuit easily, at a low cost and with a compact structure.

In the above-described hydraulic circuit, the orifice may be an annular clearance which is defined between the internal circumferential surface of the cylindrical hole and the external circumferential surface of the spool. In the closed state, a communication passage for air bleeding may be provided between the valve body provided with the intake port and the end portion of the spool so as to communicate the clearance with the intake port.

Because the fitting clearance between the internal circumferential surface of the cylindrical hole of the relief valve and the external circumferential surface of the spool functions as an air bleeding orifice and therefore, no large-scale design change of the relief valve is required. Only by changing the diameter dimension thereof, the clearance can be regulated easily to obtain a predetermined air bleeding performance while securing sealing performance of the hydraulic oil.

In the above-described hydraulic circuit, the communication passage may include an annular groove and a rugged portion. An end portion of the spool may be the small-diameter portion having a smaller diameter than the other portions of the spool. The annular groove may be located at an outside of the small-diameter portion in a radial direction. The annular groove may be continuous with the clearance. The annular groove may be defined between the cylindrical hole and the spool. The rugged portion may be provided on an end face of an end portion side of the spool so as to communicate the annular groove with the intake port in the closed state.

The air bleeding communication passage which communicates the fitting clearance with the intake port is constituted of the annular groove provided on the end portion of the spool and the rugged portion provided on the end face of the spool. Thus, in the closed state of the relief valve, hydraulic oil containing air in the discharge oil passage flows into the annular fitting clearance smoothly through the annular groove from the rugged portion, so that the fitting clearance functions as the air bleeding orifice properly.

In the above-described hydraulic circuit, hydraulic oil discharged from the orifice together with air may be to an oil tank directly or through a lubrication portion.

The hydraulic oil containing a large amount of air discharged from the air bleeding orifice in the initial period of the startup of the oil pump is returned to the oil tank, thereby further improving the startup performance of the discharge pressure. In case where the air bleeding orifice is incorporated in the relief valve as mentioned in the third invention to the fifth invention, for example, the hydraulic oil discharged from the discharge port of the relief valve may be returned to the intake oil passage of the oil pump in order to reduce load of the oil pump. However, when the hydraulic oil containing a large amount of air discharged through the fitting clearance in the initial period of the startup of the pump is returned from the air bleeding orifice to the intake oil passage and then, it absorbs air again and is discharged to the discharge oil passage. As a result, the rise-up performance of the discharge pressure is hampered.

In the above-described hydraulic circuit, the orifice may be disposed above the discharge oil passage so as to communicate with a top portion of the discharge oil passage. The "above" or "top portion" means "above" or "top portion" in the perpendicular direction when a vehicle is held in the horizontal posture and they do not have to be just above but may be obliquely above. In a word, when air mixed in the hydraulic oil rises due to buoyancy, they may be in any direction as long as it can rise.

Because the air bleeding orifice is disposed above the discharge oil passage and communicates with the top portion of the discharge oil passage, air in the discharge oil passage is discharged more quickly through the air bleeding orifice. That is, air is likely to be trapped at upper portions and the air trapping is likely to be generated at a portion which communicates with the air bleeding orifice. Thus, with a startup of the pump, the air trapping is discharged quickly through the air bleeding orifice. Further, even in the period of pump stop, air is raised by vibration or the like of the vehicle so that it is discharged through the air bleeding orifice properly.

In the above-described hydraulic circuit, the oil pump may be an electric oil pump. The hydraulic circuit may include a mechanical oil pump. The mechanical oil pump may be configured to be driven by an internal combustion engine that is a driving power source for traveling of the vehicle. The discharge oil passage of the electric oil pump may be connected to an oil passage communicating with the mechanical oil pump at a connecting point. A check valve may be configured to permit distribution of hydraulic oil to the connecting point side and block the distribution of hydraulic oil to the electric oil pump side. The check valve may be disposed on the discharge oil passage between the connecting point and the electric oil pump. The orifice may communicate with the discharge oil passage between the electric oil pump and the check valve.

In case where, in addition to the electric oil pump provided with the air bleeding orifice, the mechanical oil pump is provided in parallel thereto, the check valve is provided between the connecting point of the both discharge oil passages and the electric oil pump and the air bleeding orifice communicates between the check valve and the electric oil pump. As a result, air is discharged through the air bleeding orifice before the check valve thereby stabilizing the valve opening characteristic of the check valve.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
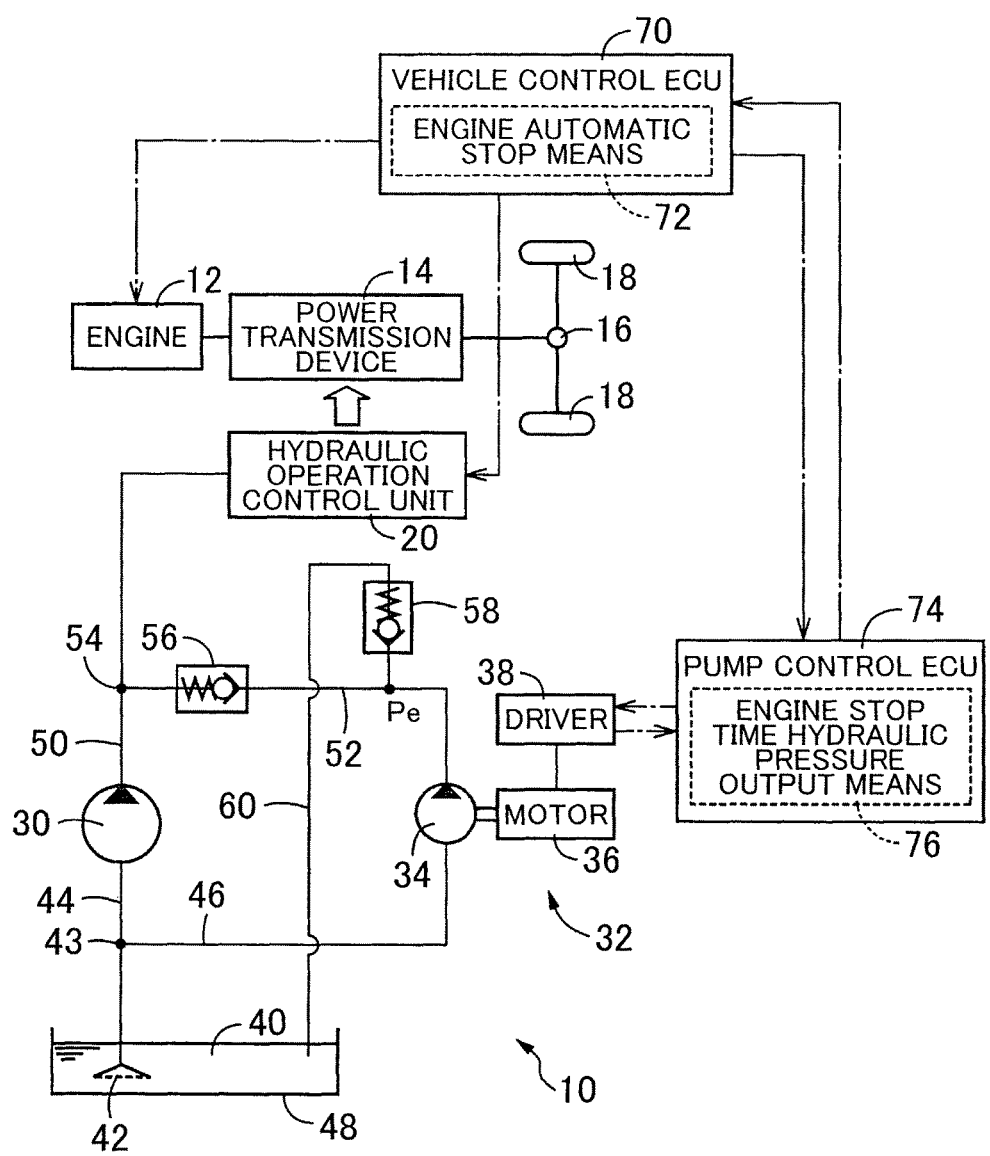
FIG. 1 is a diagram for explaining a schematic structure of a vehicle provided with a hydraulic circuit according to an embodiment of the present invention.

The present invention can be applied to a hydraulic circuit of a power transmission device for various vehicles such as an engine-driven vehicle having only an internal combustion engine as its traveling power source, a hybrid vehicle having the internal combustion engine and an electric motor, and an electric vehicle having only an electric motor. The power transmission device for the vehicle includes, for example, a belt type continuously variable transmission in which belt compression force or transmission gear ratio is controlled by a hydraulic actuator, stepped automatic variable transmission containing a plurality of friction engaging units (clutch, brake) which are engaged by each of hydraulic actuators to switch a plurality of gear positions each having a different transmission gear ratio, and a forward/backward switching device for switching forward/backward traveling by means of a friction engaging unit (clutch, brake) which is engaged by the hydraulic actuator. Hydraulic oil output from an oil pump is used for operating those hydraulic actuators and also as lubricant for lubricating meshing parts and the like of a bearing portion and gears. With air mixed by stirring upon lubrication, the hydraulic oil is returned to the oil tank and then, pumped up by the oil pump for repeated use.

For a vehicle including a mechanical oil pump which is driven by an internal combustion engine used as a traveling power source as well as an electric oil pump and further having an idling stop control means for stopping the internal combustion engine when the vehicle is stopped, the present invention is preferably applied to its hydraulic circuit which, when the idling stop control is executed, outputs a hydraulic pressure (standby pressure or the like) through the electric oil pump in order to prevent power transmission of its power transmission device from being deteriorated due to a shortage of the hydraulic pressure of the hydraulic actuator when the idling stop control is released by oil retreat accompanied by a stop of the mechanical oil pump. The present invention can be executed in various aspects. For example, although the hydraulic pressure may be supplied by the electric oil pump in the period of the idling stop control, the electric oil pump may be actuated to supply the hydraulic pressure quickly when the idling stop control is released because the response of the electric oil pump is excellent. As well as upon the idling stop control, the present invention can be applied to also a vehicle having economic run control means for stopping the internal combustion engine at the time of inertia traveling with an accelerator OFF or decelerated traveling. In the mean time, the present invention can be applied to also a hydraulic circuit of a power transmission device for a vehicle having no mechanical oil pump. A discharge oil passage of the mechanical oil pump may be provided with an air bleeding orifice. The present invention can be applied to such a hydraulic circuit.

A set pressure for limiting the discharge function of the air bleeding orifice by means of an orifice switching device is determined appropriately depending on a usage condition of the oil pump or the like in order to limit the discharge function of the air bleeding orifice at the time of normal oil pump operation, for example, when the relief valve is turned into a relief state. Although the set pressure may be constant, it can be set variable to open/close the oil passage by means of an on/off valve or the like by detecting the outlet pressure through a hydraulic sensor or the like. Although the limitation of the discharge function can be performed by disabling the discharge function by shutting down a flow of hydraulic oil passing the air bleeding orifice with the on/off valve or the like, distribution of the hydraulic oil may be limited by increasing passage resistance by prolonging the air bleeding orifice or reducing the passage sectional area.

According to an aspect of the present invention, a circular fitting clearance between the internal circumferential surface of a cylindrical hole and the external circumferential surface of a spool functions as an air bleeding orifice. If the air bleeding is enabled by reducing only the diameter dimension of the spool with the internal circumferential surface of the cylindrical hole kept as it is compared to a conventional product, the conventional oil pump can be used as it is with the hydraulic characteristic in the relief condition kept the same as conventionally. In a closed condition, it can be made to function as an air bleeding orifice. In the aspect of the present invention, a communication hole for air bleeding which communicates an intake port with a discharge port in the closed state so as to enable the air bleeding may be also provided in the spool. In the aspect of the present invention, for example, it is permissible to provide an air bleeding orifice in parallel to the relief valve while the on/off valve is connected in series to the air bleeding orifice so that when the hydraulic pressure exceeds a set pressure, the on/off valve is closed to disable the discharge function of the air bleeding orifice.

In the relief valve, its relief pressure is determined by an urging force of an urging means. For example, to relieve the hydraulic oil with a predetermined constant relief pressure, the urging means is constituted of a coil spring or the like. It is also permissible to adopt a relief valve capable of controlling a relief pressure electrically by urging the spool with a solenoid or by urging the spool with a signal hydraulic pressure regulated with a pressure regulating valve.

In the aspect of the present invention, the air bleeding orifice is disposed above a discharge oil passage. If the air bleeding orifice is provided in the spool of the relief valve, it is preferred to be disposed so that an intake port is positioned at a down position in the up-down direction in such a posture that the center line of the relief valve is along the up-down direction. It does not have to be completely in the up-down direction but may be inclined. Although a check valve is used in the aspect of the present invention, instead of the check valve, it is permissible to provide an electromagnetic on/off valve and open/close the oil passage electrically with a predetermined, timing.

Hereinafter, an embodiment of the present invention will be described in detail with reference to the drawings. FIG. 1 is a diagram for explaining a schematic structure of a vehicle provided with a hydraulic circuit 10 according to an embodiment of the present invention. An output of an engine 12 which is an internal combustion engine as a traveling driving power source is transmitted from a power transmission device 14 to right and left drive wheels 18 through a differential gear unit 16. In the present embodiment, the power transmission device 14 includes a belt-type continuously-variable transmission in which belt compression force or transmission gear ratio is controlled by a hydraulic actuator (hydraulic cylinder), a forward/backward switching device for switching forward/backward traveling by means of a hydraulic actuator (clutch, brake). The aforementioned hydraulic circuit 10 is constituted so as to include a hydraulic operation control unit 20 which contains the hydraulic actuator, hydraulic control valve, electromagnetic switching valve and the like. Part of hydraulic oil 40 supplied to the hydraulic operation control unit 20 is used as lubricant, which lubricates each section of the power transmission device 14 and is returned to an oil pan 48 through a distribution oil passage (not shown). The oil pan 48 is equivalent to an oil tank.

The hydraulic circuit 10 includes the mechanical oil pump 30 and the electric oil pump 32, and the mechanical oil pump 30 is connected mechanically to the engine 12 so that it is rotationally driven mechanically. On the other hand, in the electric oil pump 32, its pump 34 is rotationally driven only in an arbitrary period at an arbitrary timing by an electric motor 36. The mechanical oil pump 30 and the electric oil pump 32 are provided with a common intake port (strainer) 42, which is connected to intake oil passages 44, 46 which are branched at a branch point 43 located halfway. Hydraulic oil 40 returned to an oil pan 48 provided at the bottom of a transmission case is pumped up through the intake port 42 and discharged to the discharge oil passages 50, 52. The discharge oil passages 50, 52 are connected to each other at a connecting point 54 to, supply the hydraulic oil 40 to the hydraulic operation control unit 20. The output performance of the mechanical oil pump 30 is sufficiently higher than the electric oil pump 32. The discharge oil passage 52 is provided with a check valve 56 for preventing the hydraulic oil 40 discharged from the mechanical oil pump 30 from flowing into the electric oil pump 32 side. Further, a relief valve 58 which, when a discharge pressure Pe which is a hydraulic pressure in the discharge oil passage 52 is equal to or higher than a predetermined relief pressure Per, relieves the hydraulic oil 40 in the discharge oil passage 52 to a drain oil passage 60 and returns it to the oil pan 48 is provided between the check valve 56 and the electric oil pump 32

Figure 2:
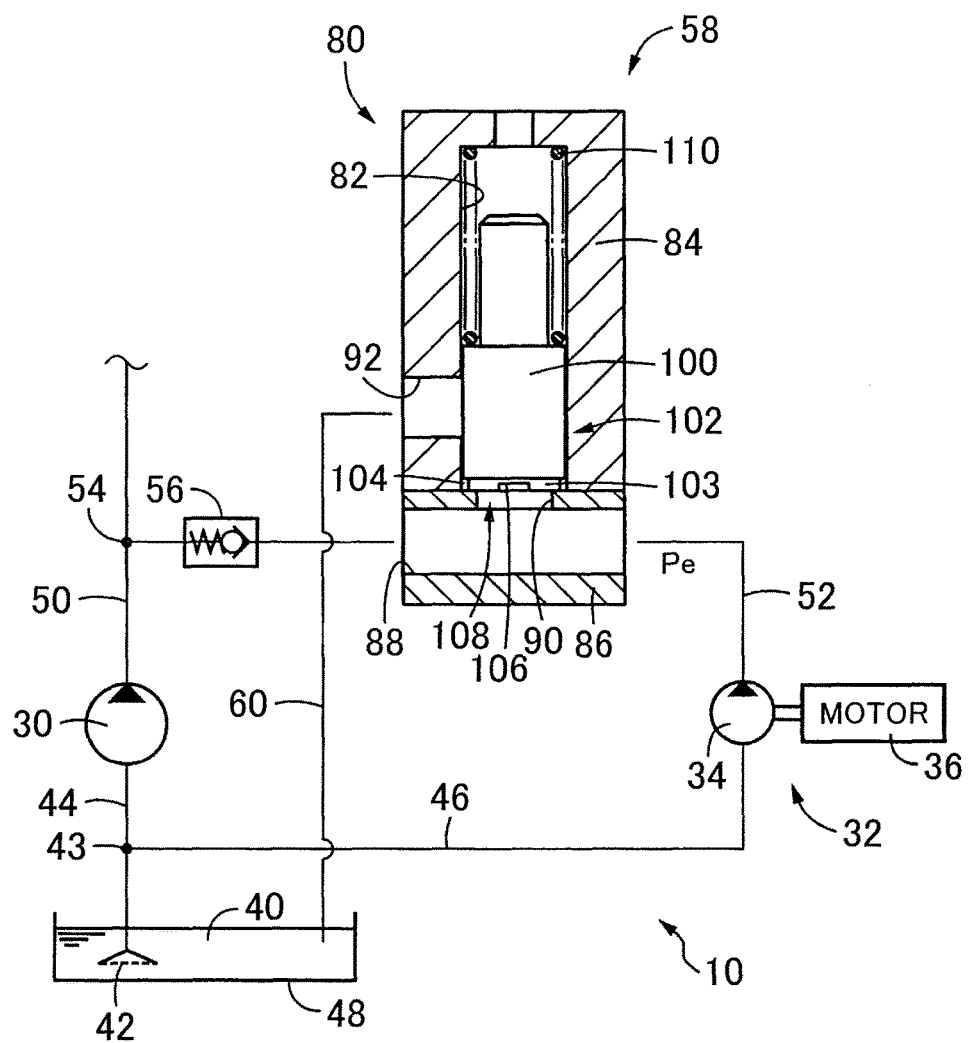
FIG. 2 is a diagram showing a section of a relief valve provided in the hydraulic circuit of FIG. 1 with a hydraulic circuit of a hydraulic pressure source portion.

FIG. 2 is a circuit diagram illustrating the structure of the aforementioned relief valve 58 with its sectional view to explain it specifically. The relief valve 58 is a spool valve which includes a valve body 80 having a cylindrical hole 82 and a spool 100 which is fitted into the cylindrical hole 82 movably in the axial direction and is disposed in a posture in which its center line is substantially along the up-down direction of a vehicle. The valve body 80 includes a first member 84 containing the cylindrical hole 82 and a second member 86 containing a through hole 88 which functions as a part of the discharge oil passage 52. The second member 86 is fixed integrally on the bottom end of the first member 84 such that the through hole 88 is substantially in a horizontal posture. The cylindrical hole 82 is open at the bottom end of the first member 84 and the second member 86 has an intake port 90 having a smaller diameter than the cylindrical hole 82, the intake port 90 being provided in a wall portion of the top side of the through hole 88 such that it is substantially coaxial with the cylindrical hole 82. The discharge oil passage 52 communicates with the cylindrical hole 82 through the intake port 90. The bottom end portion of the cylindrical hole 82 communicating with the intake port 90 is equivalent to an end portion thereof in the axial direction. In the first member 84, a discharge port 92 is provided at an intermediate portion in the axial direction of the cylindrical hole 82.

Figure 4:
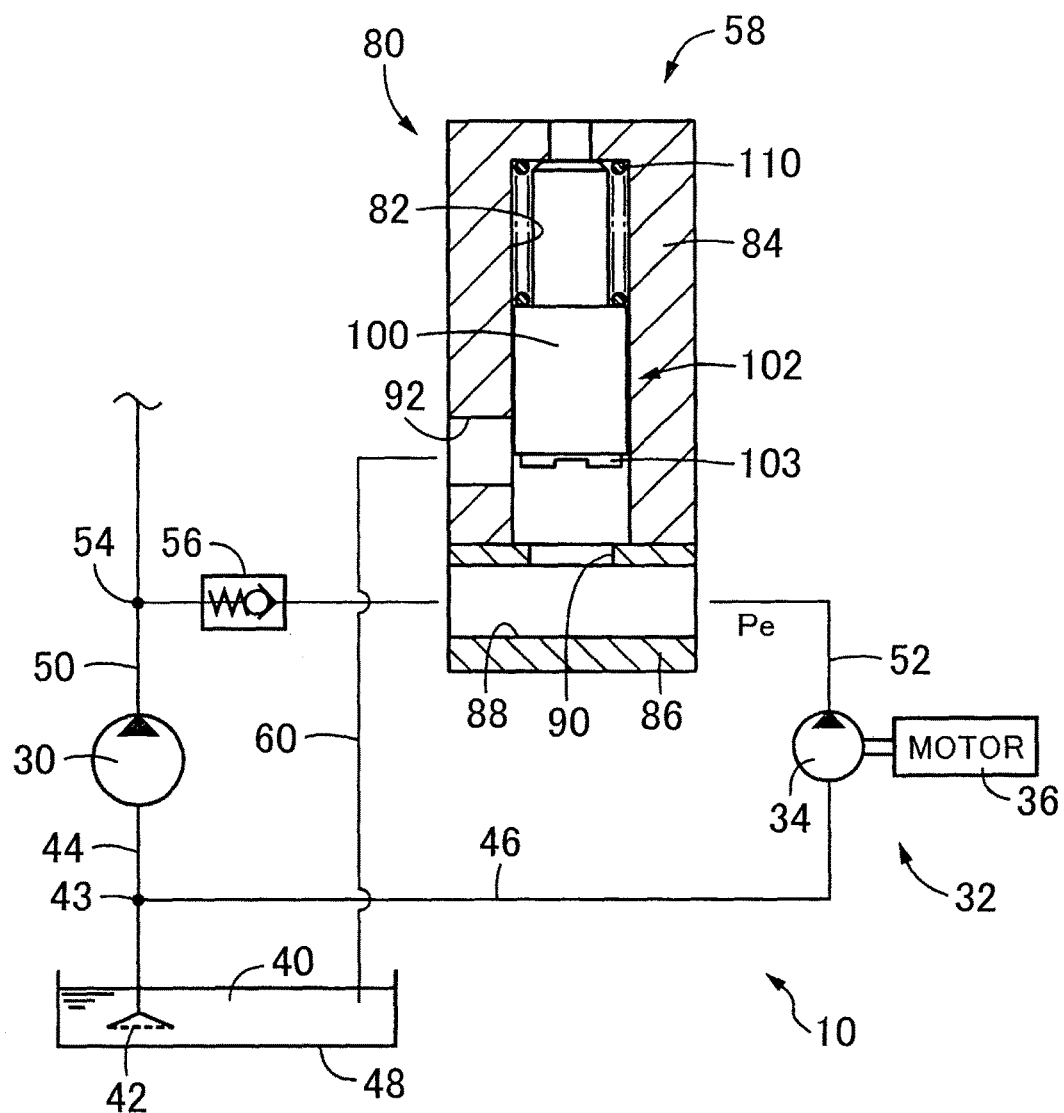
FIG. 4 is a sectional view showing a relief state of the relief valve of FIG. 2.

The communication between the intake port 90 and the discharge port 92 is achieved and shut down by the spool 100. The spool 100 is urged downward with a constant urging force which is predetermined by a compression coil spring 110 as an urging means. When the bottom end portion thereof contacts the second member 86 as show in FIG. 2, the spool 100 is in a closed state of shutting down the communication between the intake port 90 and the discharge port 92. On the other hand, if the discharge pressure Pe in the discharge oil passage 52 reaches the relief pressure Per, the spool 100 is retreated upward resisting the urging force of the compression coil spring 110. As a result, as shown in FIG. 4, the relief state is attained so that the intake port 90 and the discharge port 92 communicates with each other through the cylindrical hole 82. Then, the hydraulic oil 40 in the discharge oil passage 52 is returned from the relief valve 58 to the oil pan 48 through the drain oil passage 60. As a consequence, the discharge pressure Pe in the discharge oil passage 52, further a hydraulic pressure supplied from the discharge oil passage 52 to the hydraulic operation control unit 20 through the check valve 56 is held at the relief pressure Per or more. In the mean time, instead of the compression coil spring 110, other urging means may be used, for example, by urging the spool 100 with a solenoid together with the compression coil spring 110 or urging the spool 100 with a signal oil pressure regulated by a pressure regulating valve.

Figure 3:
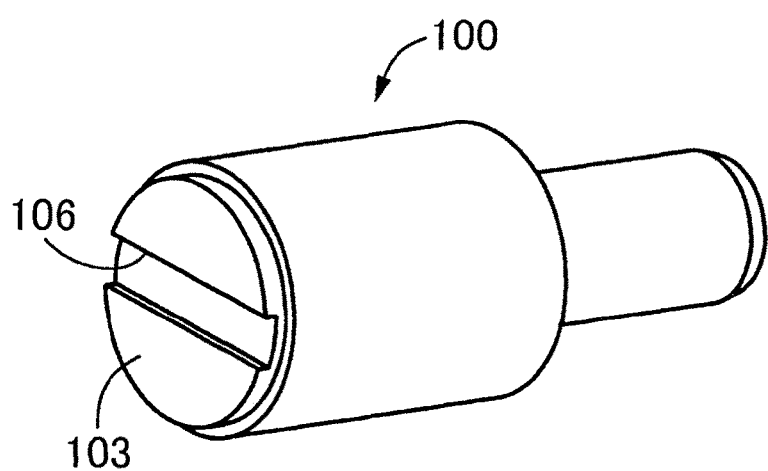
FIG. 3 is a perspective view showing a spool of the relief valve of FIG. 2 independently.
Figure 5:
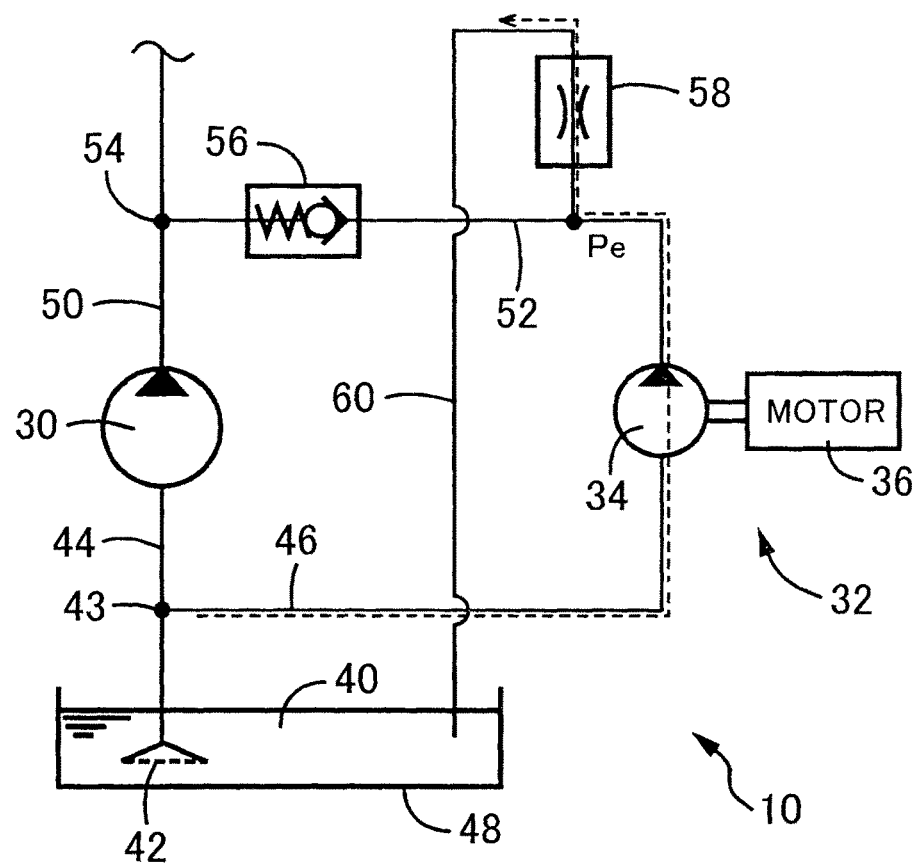
FIG. 5 is a hydraulic circuit diagram in case where the relief valve of FIG. 2 functions as an air bleeding orifice when it is in a closed state.

A circular fitting clearance 102 between the external circumferential surface of the spool 100 and the internal circumferential surface of the cylindrical hole 82, is set relatively larger than conventionally by reducing the outside diameter of the spool 100, so that in the above-described closed state, it functions as an air bleeding orifice for discharging air from the intake port 90 to the discharge port 92. That is, to discharge air mixed in the hydraulic oil 40 while suppressing flow out of the hydraulic oil 40, a difference in dimension between the outside diameter of the spool 100 and the inside diameter of the cylindrical hole 82 is set to an appropriate value in a range of for example, 10 to 150 μm through experiments by considering a height dimension (length of the fitting clearance 102) from the bottom end of the cylindrical hole 82 up to the discharge port 92 and the like. As evident from the perspective view of FIG. 3 indicating the spool 100 independently, a small-diameter portion 103 is provided at the bottom end of the spool 100 so that in the closed state, an annular groove 104 is formed relative to the cylindrical hole 82. A slit (groove) 106 is provided on an end face of the small-diameter portion 103 in a direction perpendicular to the axis. As a result, in the closed state, the fitting clearance 102 communicates with the intake port 90 so that the fitting clearance 102 functions as an air bleeding orifice properly. The slit 106 is equivalent to an uneven part provided on the end face of an end portion side of the spool 100 configured to communicate the annular groove 104 with the intake port 90 and an air bleeding communication passage 108 is constituted of the annular groove 104 and the slit 106. FIG. 5 is a hydraulic circuit diagram in case where the relief valve 58 functions as an air bleeding orifice when it is in the closed state;

On the other hand, in the relief state shown in FIG. 4, the intake port 90 communicates with the discharge port 92 through the cylindrical hole 82, so that the hydraulic oil 40 in the discharge oil passage 52 flows out directly to the discharge port 92 from the intake port 90 through the cylindrical hole 82. Thus, the fitting clearance 102 is disabled from functioning as the air bleeding orifice properly. Although there is a possibility that part of the hydraulic oil 40 may flow out upward of the cylindrical hole 82 through the fitting clearance 102, because the length dimension of the fitting clearance 102 above the discharge port 92 is larger than the length dimension from the bottom end to the discharge port 92 in the closed state, distribution resistance increases by a corresponding amount thereby limiting the flow-out. That is, although the fitting clearance 102 functions as the air bleeding orifice in the closed state, the spool 100 is retreated resisting the urging force of the compression coil spring 110 in the relief state. Consequently, flow-out of the hydraulic oil 40 from the fitting clearance 102 is limited thereby allowing the electric oil pump 32 having substantially equivalent discharge performance as conventionally to be used. In the present embodiment, when the discharge pressure Pe reaches the predetermined set pressure, the spool 100 and the compression coil spring 110 function as an orifice switching device which limits the discharge function of the air bleeding orifice, and the relief pressure Per which retreats the spool 100 is the set pressure.

Returning to FIG. 1, a vehicle having such a hydraulic circuit 10 includes a vehicle control ECU (electronic control unit) 70 and a pump control ECU 74. Each of the vehicle control ECU 70 and the pump control ECU 74 is constituted of a microcomputer and performs a predetermined signal processing according to a preliminarily determined program in a ROM while using a temporary storage function such as a RAM. The vehicle control ECU 70 executes output control of the engine 12 corresponding to an accelerator operation amount or the like and speed control of the power transmission device 14 corresponding to the accelerator operation amount, vehicle velocity and the like. A necessary signal is supplied from an accelerator operation amount sensor or a vehicle velocity sensor (not shown) or the like.

The vehicle control ECU 70 has functions for executing idling stop control and economic run control. Upon executing those controls, the engine 12 is automatically stopped by an engine automatic stop means 72. The pump control ECU 74 has an engine stop time hydraulic pressure output means 76 as a function. When the engine 12 is automatically stopped, the engine stop time hydraulic pressure output means 76 rotationally drives the electric motor 36 through a motor driver 38 to output hydraulic pressure from the electric oil pump 32. By supplying the hydraulic pressure to the hydraulic operation control unit 20, the power transmission performance of the power transmission device 14 is prevented from being deteriorated due to a shortage in hydraulic pressure when the idling stop control or the economic run control is released. That is, when the engine 12 is stopped, the mechanical oil pump 30 is also stopped correspondingly so that the hydraulic pressure of the hydraulic operation control unit 20 is reduced due to the oil retreat. When the engine 12 is driven with restart or reacceleration, the hydraulic pressure is output from the mechanical oil pump 30. However, if no sufficient hydraulic pressure is supplied to the hydraulic operation control unit 20 due to a delay in rise-up of the hydraulic pressure, there is a possibility that the friction engaging unit of the power transmission device 14 may be slipped or a shock may occur due to a delay in engagement. Corresponding to this, if hydraulic pressure is supplied from the electric oil pump 32 at the time of an engine stop to supplement a shortage in hydraulic pressure due to the oil retreat, a sufficient hydraulic pressure can be generated quickly with a restart of the operation of the engine 12 thereby actuating the power transmission device 14 properly.

Figure 6:
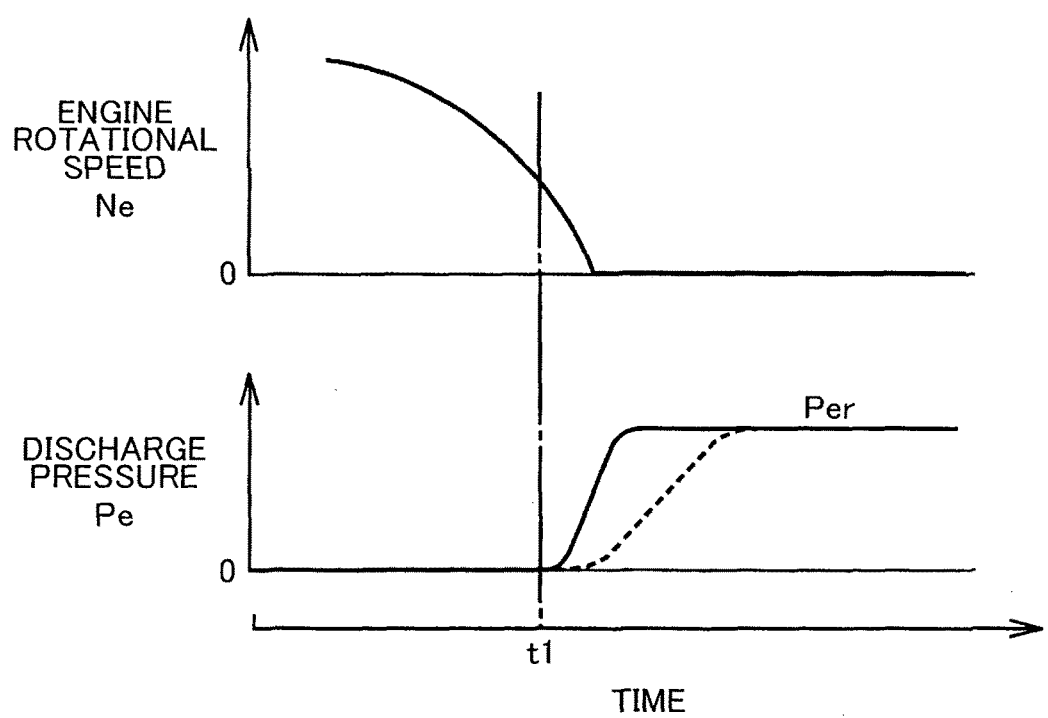
FIG. 6 is an example of a time chart showing changes in rotational speed of an engine and discharge pressure when an electric oil pump is actuated with an engine stop of a vehicle of FIG. 1.

Further, in the present embodiment, because the fitting clearance 102 of the relief valve 58 functions as the air bleeding orifice, when the electric oil pump 32 is started to supply hydraulic pressure to the hydraulic operation control unit 20 at the time of engine stop, the discharge pressure Pe can be raised quickly as indicated with a solid line in FIG. 6. In the present invention, because the hydraulic oil 40 is used as lubricant, fine air (air bubble) is mixed in the hydraulic oil 40 due to stirring upon lubrication. Because the hydraulic oil 40 is returned to the oil pan 48 and used repeatedly, there is a possibility that the rise-up of the discharge pressure Pe may be delayed by existence of the air as indicated with a dotted line in FIG. 6 when the electric oil pump 32 is started. However, because the relief valve 58 functions as the air bleeding orifice, generation of air trapping is suppressed, and further, air is discharged quickly in the initial period of the startup of the electric oil pump 32, so that the discharge pressure Pe is raised quickly. That is, during a stop of the electric oil pump 32, air in the hydraulic oil 40 is moved as indicated by a dotted line in FIG. 5, for example. As a result, the air trapping occurs at the intake port 90 and the like of the relief valve 58 and with a start of the electric oil pump 32, the air is discharged quickly through the fitting clearance 102. Also, even during a stop of the electric oil pump 32, a part of the air is discharged through the fitting clearance 102 due to vibration of the vehicle or the like thereby suppressing generation of the air trapping. As a consequence, the discharge pressure Pe can be raised quickly with the start of the electric oil pump 32. Further, even if the accelerator pedal is pressed repeatedly in a short time after the engine 12 is stopped, the shortage of the hydraulic pressure in the hydraulic operation control unit 20 is suppressed. Contrary to this, if no air bleeding is executed, the air in the air trapping needs to be compressed and dispersed finely when the discharge pressure Pe is raised. Because the change in hydraulic pressure is small during compression of air, the gradient of the rise-up of the discharge pressure Pe is mild as indicated with a dotted line in FIG. 6. A time t1 in FIG. 6 is a time when engine rotational speed Ne becomes equal to or lower than a predetermined determination value so that a startup instruction of the electric oil pump 32 is output.

On the other hand, if the discharge pressure Pe reaches the relief pressure Per so that the hydraulic oil 40 in the discharge oil passage 52 is relieved from the relief valve 58 to the drain oil passage 60, the spool 100 of the relief valve 58 is retreated. As a result, the fitting clearance 102 is disabled to function as the air bleeding orifice properly. Thus, flow-out of the hydraulic oil 40 through the fitting clearance 102 is limited. Consequently, a predetermined discharge flow rate can be secured using the electric oil pump 32 having substantially the same discharge performance as conventionally.

In the hydraulic circuit 10 of the present embodiment, the fitting clearance 102 of the relief valve 58 functions as the air bleeding orifice. If the discharge pressure Pe in the discharge oil passage 52 reaches the relief pressure Per so that the relief valve 58 is turned into the relief state, the air bleeding function is limited by movement of the spool 100 thereby suppressing flow-out of the hydraulic oil 40 from the fitting clearance 102. As a result, generation of the air trapping is suppressed by the air bleeding function of the relief valve 58 in the closed state and air in the discharge oil passage 52 is discharged quickly in the initial period of the startup of the electric oil pump 32. Then, the rise-up of the discharge pressure Pe is improved. During normal pump operation in which the discharge pressure Pe in the discharge oil passage 52 reaches the relief pressure Per so that the relief valve 58 is held in the relief state, pressure loss due to flow out of the hydraulic oil 40 from the air bleeding orifice (fitting clearance 102) is suppressed. Thus, the electric oil pump 32 having substantially the same discharge performance as conventionally can be used. That is, while avoiding deterioration in mountability of the electric oil pump 32 onto a vehicle and in fuel efficiency due to an increased size thereof and increase of, manufacturing cost, the rise-up performance of the discharge pressure Pe can be improved by discharging air through the fitting clearance 102 which functions as the air bleeding orifice.

The relief valve 58 is a spool valve having the spool 100. The spool 100 is formed in a small diameter so as to provide the fitting clearance 102 which functions as the air bleeding orifice. Then, the spool 100 and the compression coil spring 110 function as an orifice switching device. That is, the air bleeding orifice and the orifice switching device are constructed integrally with the relief valve 58 thereby constituting the hydraulic circuit 10 easily, at a low cost and with a compact structure.

Further, the fitting clearance 102 between the internal circumferential surface of the cylindrical hole 82 of the relief valve 58 and the external circumferential surface of the spool 100 functions as an air bleeding orifice and therefore, no large-scale design change of the relief valve 58 is required. Only by changing the diameter dimension thereof, the clearance can be regulated (tuning) easily to obtain a predetermined air bleeding performance while securing sealing performance of the hydraulic oil 40.

Further, the air bleeding communication passage 108 which communicates the fitting clearance 102 with the intake port 90 is constituted of the annular groove 104 provided on the bottom end portion of the spool 100 and the slit 106 provided on the end face of the spool 100. Thus, in the closed state of the relief valve 58, the hydraulic oil 40 containing air in the discharge oil passage 52 flows into the annular fitting clearance 102 through the annular groove 104 from the slit 106, so that the fitting clearance 102 functions as the air bleeding orifice properly.

Further, the hydraulic oil 40 containing a large amount of air discharged from the air bleeding orifice (fitting clearance 102) in the initial period of the startup of the electric oil pump 32 is returned directly to the oil pan 48 from the drain oil passage 60, thereby improving the startup performance of the discharge pressure. Pe. That is, although in the present embodiment, the fitting clearance 102 which functions as the air bleeding orifice is provided in the relief valve 58, the hydraulic oil 40 discharged from the discharge port 92 of the relief valve 58 is sometimes returned to the intake oil passage 46 of the electric oil pump 32 in order to reduce load of the electric oil pump 32. In that case, the hydraulic oil 40 containing a large amount of air discharged through the fitting clearance 102 in the initial period of the startup is returned to the intake oil passage 46 and then, the hydraulic oil absorbs air again and is discharged to the discharge oil passage 52. As a result, the rise-up performance of the discharge pressure Pe is hampered.

The relief valve 58 having a function of the air bleeding orifice is disposed above the through hole 88 which functions as the discharge oil passage 52 so as to attain communication with a upper portion of the through hole 88. Thus, air in the discharge oil passage 52 and the through hole 88 is discharged through the fitting clearance 102 further quickly. That is, air is likely to be trapped at upper portions and the air trapping is likely to be generated at the intake port 90. Thus, with a startup of the electric oil pump 32, the air trapping is discharged through the fitting clearance 102 quickly. Further, during a stop of the electric oil pump 32, air rises due to vibration of a vehicle as shown with a dotted line in FIG. 5 so that it is discharge appropriately through the fitting clearance 102 of the relief valve 58.

In addition to the electric oil pump 32, the mechanical oil pump 30 is disposed in parallel thereto and the check valve 56 is provided between the connecting point 54 of the discharge oil passages 50, 52 of both and the electric oil pump 32. The relief valve 58 having the function of the air bleeding orifice is adapted to communicate between the check valve 56 and the electric oil pump 32. As a result, air is discharged from the air bleeding orifice (fitting clearance 102) before the check valve 56 thereby stabilizing the valve opening characteristic of the check valve 56.

Next, other embodiments of the present invention will be described. In the meantime, in a following embodiment, like reference numerals are attached to substantially common components to the above-described embodiment and a detailed description thereof is omitted.

Figure 7:
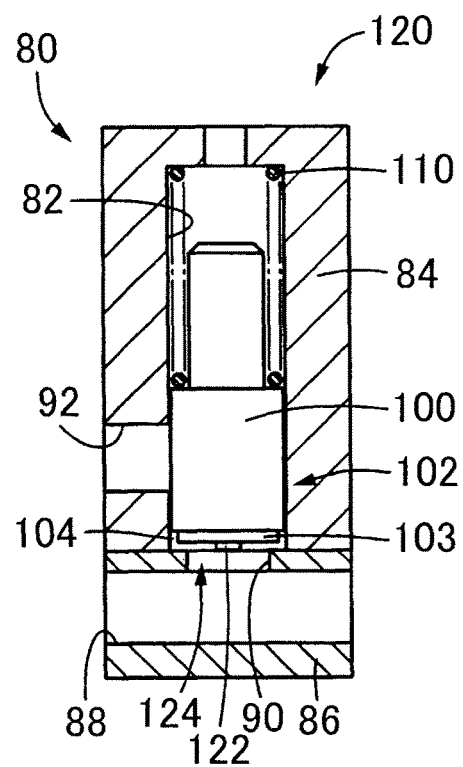
FIG. 7 is a sectional view showing another example of the relief valve for use in the hydraulic circuit of FIG. 1.
Figure 8:
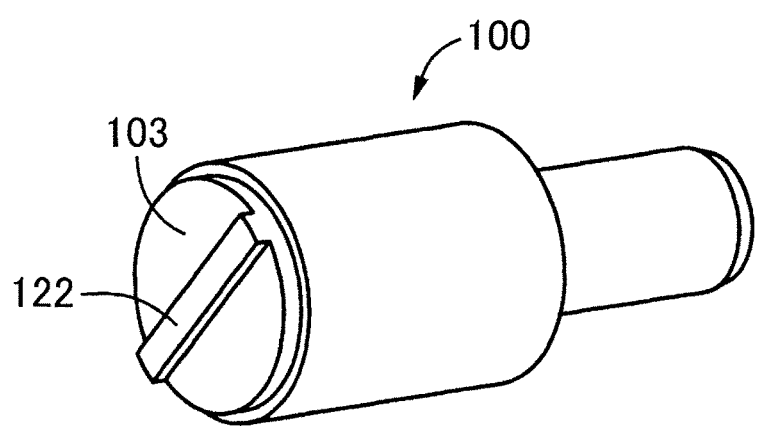
FIG. 8 is a perspective view showing a spool of the relief valve of FIG. 7 independently.

A relief valve 120 shown in FIG. 7 is used instead of the aforementioned relief valve 58 and equal to the relief valve 58 in that the fitting clearance 102 is provided as the air bleeding orifice. However, as evident from a perspective view of FIG. 8 illustrating the spool 100 independently, a protruded row 122 is provided instead of the slit 106 on an end face of the small-diameter portion 103 of the spool 100 such that it intersects with the axis. The protruded row 122 is equivalent to the rugged portion and its width dimension is sufficiently smaller than the diameter dimension of the intake port 90. When the protruded row 122 is brought into contact with the second member 86, a communication passage which communicates the intake port 90 with the annular groove 104 is formed on both sides of the protruded row 122. The air bleeding communication passage 124 which communicates the intake port 90 with the fitting clearance 102 is configured with the communication passage on both sides of the protruded row 122 and the annular groove 104. The present embodiment also can secure substantially the same operation and effect as the above-described embodiment.

Figure 9:
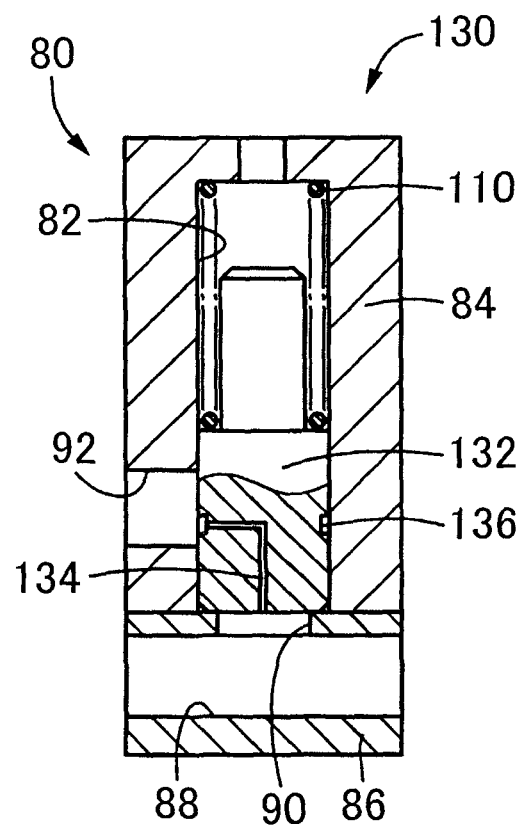
FIG. 9 is a sectional view showing still another example of the relief valve for use in the hydraulic circuit of FIG. 1.
Figure 10:
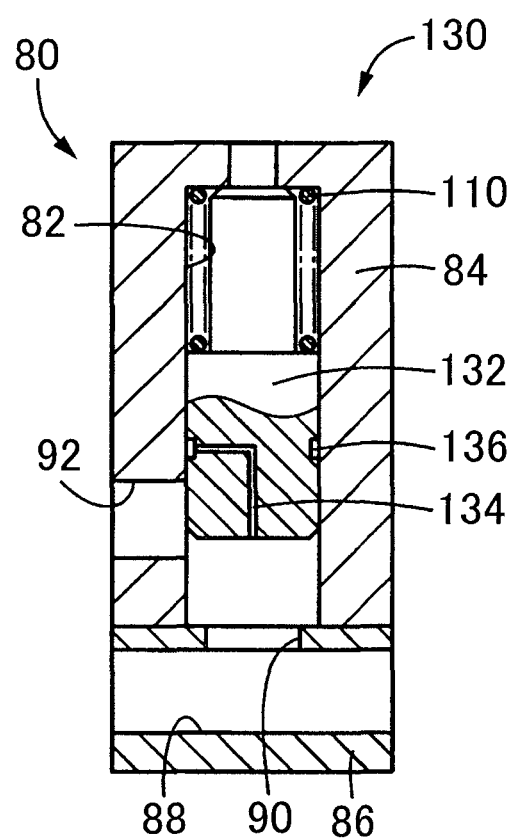
FIG. 10 is a sectional view showing a relief state of the relief valve of FIG. 9.

A relief valve 130 shown in FIG. 9 is also used instead of the aforementioned relief valve 58 and a spool 132 which is fitted to the cylindrical hole 82 in the valve body 80 movably in the axial direction is different. The spool 132 has a larger diameter than the spool 100 and the fitting clearance relative to the internal circumferential surface of the cylindrical hole 82 is smaller than the fitting clearance 102 of the above-described embodiment and does not function as the air bleeding orifice. Instead, a communication hole 134 is provided in the spool 132. The communication hole 134 functions as the air bleeding orifice and the diameter of the hole, that is, the passage sectional area and length thereof are determined appropriately so as to enable the air bleeding while suppressing a flow-out of the hydraulic oil 40. An end of the communication hole 134 is open at an axial portion of the bottom end face of the spool 132, as shown in FIG. 9, and even in the closed state in which the bottom end portion of the spool 132 contacts the second member 86, it communicates with the intake port 90. The other end of the communication hole 134 is open to a side face of the spool 132 and an annular groove 136 is provided at its opening, so that in the closed state shown in FIG. 9, it communicates with the discharge port 92 through the annular groove 136. In the relief state shown in FIG. 10, the annular groove 136 is located above the discharge port 92 so that it is closed by the cylindrical hole 82. As a result, air bleeding function through the communication hole 134 is disabled thereby blocking flow out of the hydraulic oil 40.

In the present embodiment, in the closed state of the relief valve 130, the communication hole 134 functions as the air bleeding orifice to suppress generation of air trapping. At the same time, air in the discharge oil passage 52 is discharged quickly in the initial period of the startup of the electric oil pump 32, so that the rise-up of the discharge pressure Pe is improved. During normal pump operation in which the discharge pressure Pe reaches the relief pressure Per to hold the relief valve 130 in the relief state, the communication hole 134 is closed so that the function as the air bleeding orifice is disabled. Because flow out of the hydraulic oil 40 from the communication hole 134 is blocked, the electric oil pump 32 having substantially the same discharge performance as conventionally can be used. That is, in the present embodiment as well as, while avoiding deterioration in mountability of the electric oil pump 32 onto a vehicle and fuel efficiency due to an increased size thereof and increase of manufacturing cost, the rise-up performance of the discharge pressure Pe can be improved by discharging air through the communication hole 134 which functions as the air bleeding orifice. As a result, substantially the same operation and effect as the above-described embodiment can be obtained.

Figure 11:
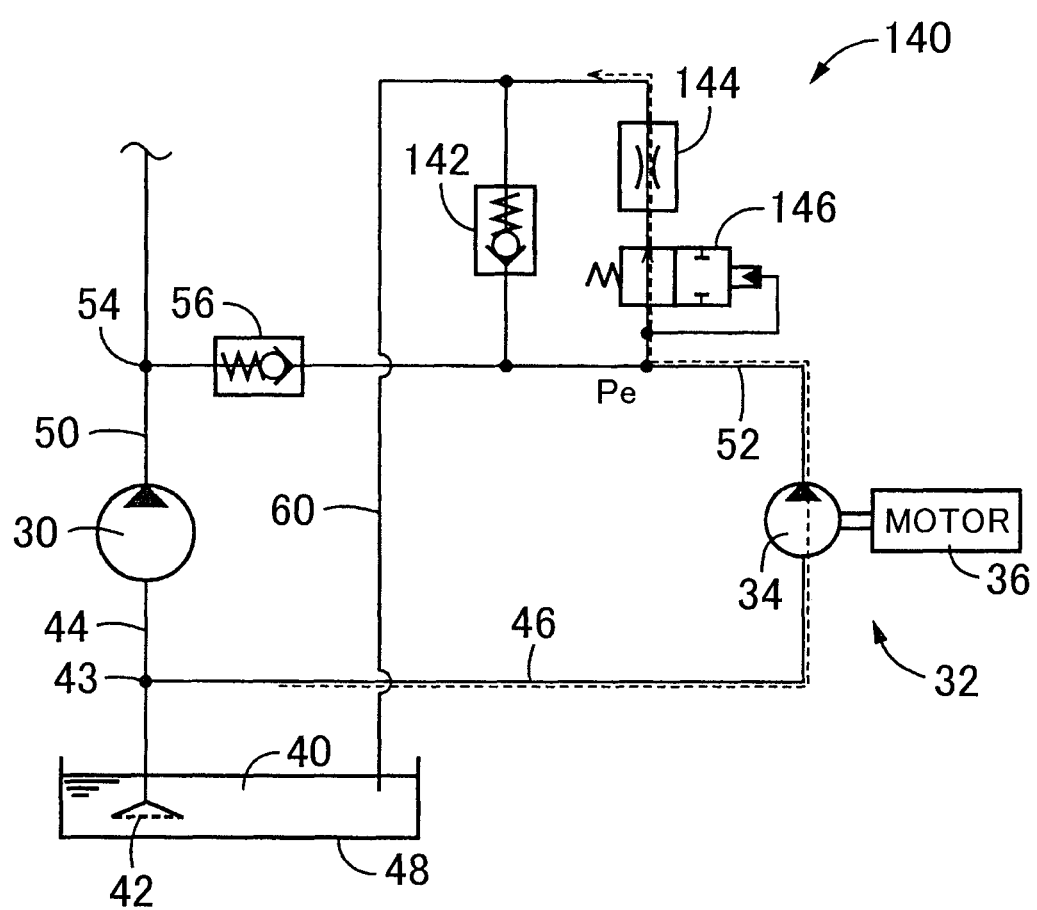
FIG. 11 is a diagram for explaining still further embodiment of the present invention, which is a hydraulic circuit diagram of a hydraulic pressure source portion including the air bleeding orifice.

In a hydraulic circuit 140 shown in FIG. 11, compared to the above-described hydraulic circuit 10, a relief valve 142 is used instead of the relief valve 58, an air bleeding orifice 144 is provided in parallel to the relief valve 142 and an on/off valve 146 is connected in series to the air bleeding orifice 144. The relief valve 142 is produced by omitting the communication hole 134 and the annular groove 136 in the relief valve 130 of FIG. 9 and has no function as the air bleeding orifice and therefore, it is used purely as a relief valve. If the discharge pressure Pe is equal to or lower than a predetermined switching pressure, the on/off valve 146 is opened according to an urging force of the urging means such as a spring, and the air bleeding orifice 144 communicates with the discharge oil passage 52. Then, air in the discharge oil passage 52 is discharged from the air bleeding orifice 144. On the other hand, if the discharge pressure Pe exceeds the switching pressure, the on/off valve is closed by using the discharge pressure Pe as a pilot pressure, so that distribution of the hydraulic oil 40 is blocked to disable the air bleeding function by the air bleeding orifice 144. The switching pressure of the on/off valve 146 is a set pressure for limiting the function of the air bleeding orifice 144. In the present embodiment, the switching pressure Pe is set at a hydraulic pressure value slightly lower than the relief pressure Per so that the on/off valve 146 is closed during the normal pump operation in which the discharge pressure Pe reaches the relief pressure Per to keep the relief valve 142 in the relief state. The on/off valve 146 and the air bleeding orifice 144 are disposed above the discharge oil passage 52 and the on/off valve 146 communicates with a top portion of the discharge oil passage 52. When the on/off valve 146 is opened, air in the intake oil passage 46 and the discharge oil passage 52 moves as indicated with a dotted line in FIG. 11 due to vibration of the vehicle or the like so that it is discharged through the air bleeding orifice 144. The on/off valve 146 is equivalent to the orifice switching device. In the meantime, instead of the pilot switching type on/off valve 146, an electromagnetic on/off valve which is opened/closed by an electric signal can be used. It is permissible to connect the air bleeding orifice 144 between the on/off valve 146 and the discharge oil passage 52.

In the present embodiment also, if the discharge pressure Pe is equal to or lower than the predetermined switching pressure which is lower than the relief pressure Per, the on/off valve 146 is opened so that air bleeding through the air bleeding orifice 144 is enabled. Thus, generation of the air trapping is suppressed and at the same time, air in the discharge oil passage 52 is discharged quickly in the initial period of the startup of the electric oil pump 32, thereby improving the rise-up of the discharge pressure Pe. Further, during the normal pump operation in which the discharge pressure Pe reaches the relief pressure Per so that the relief valve 142 is held in the relief state, the on/off valve 146 is closed so as to block flow-out of the hydraulic oil 40 through the air bleeding orifice 144. Thus, the electric oil pump 32 having substantially the same discharge performance as conventionally can be used. That is, in the present embodiment also, while avoiding deterioration in mountability of the electric oil pump 32 onto a vehicle and in fuel efficiency due to an increased size thereof and increase of manufacturing cost, the rise-up performance of the discharge pressure Pe can be improved by discharging air through the air bleeding orifice 144. As a result, substantially the same operation and effect as the above-described embodiment can be obtained.

Figure 12:
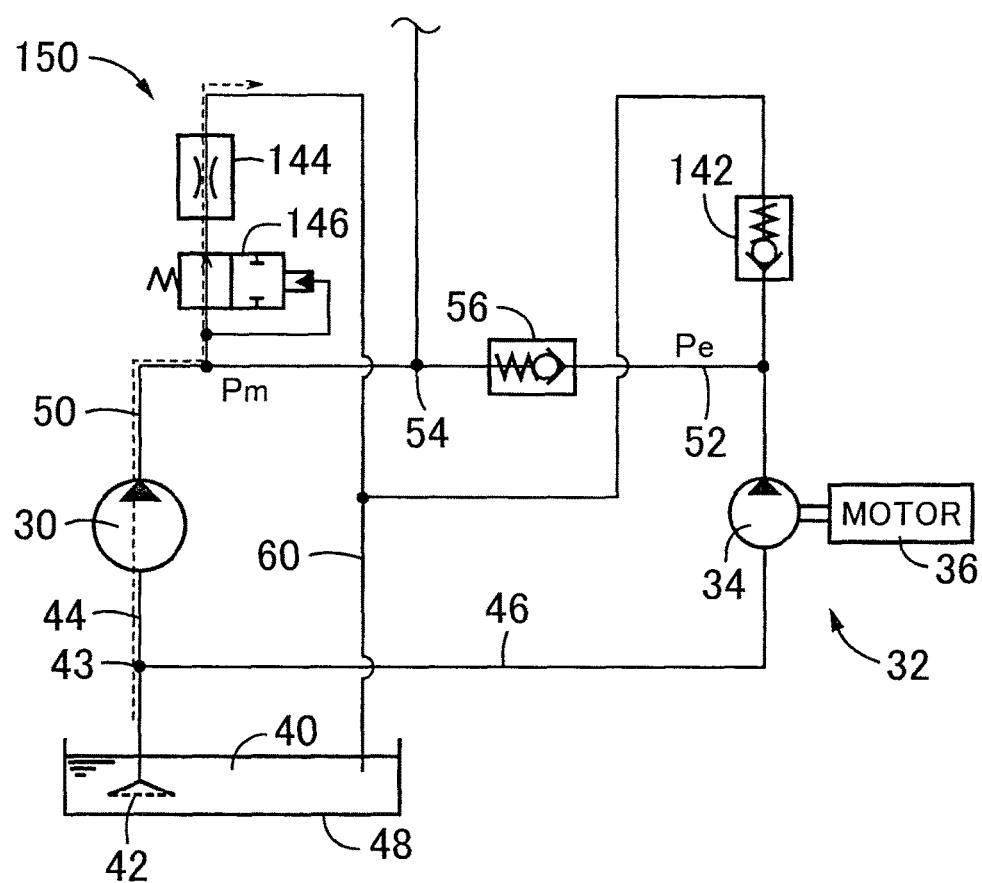
FIG. 12 is a diagram for explaining still further embodiment of the present invention or a hydraulic pressure diagram in case where the air bleeding orifice is connected to the discharge oil passage of the mechanical oil pump.

A hydraulic circuit 150 shown in FIG. 12 indicates a case where the air bleeding orifice 144 and the on/off valve 146 are connected to the discharge oil passage 50 of the mechanical oil pump 30. If a discharge pressure Pm of the mechanical oil pump 30 is equal to or lower than the predetermined switching pressure, the on/off valve 146 is opened according to the urging force of the urging means such as a spring, so that the air bleeding orifice 144 communicates with the discharge oil passage 50. Then, air in the discharge oil passage 50 is discharged through the air bleeding orifice 144. If the discharge pressure Pm exceeds the switching pressure, the on/off valve is closed by using the discharge pressure Pm as the pilot pressure, so as to block distribution of the hydraulic oil 40 thereby disabling the air bleeding function of the air bleeding orifice 144. The switching pressure of the on/off valve 146 is a set pressure for limiting the function of the air bleeding orifice 144 and during the normal operation of the mechanical oil pump 30, is determined appropriately so that the on/off valve 146 is closed. The on/off valve 146 and the air bleeding orifice 144 are disposed above the discharge oil passage 50 and the on/off valve 146 communicates with a top portion of the discharge oil passage 50. When the on/off valve 146 is opened, air in the intake oil passage 44 and the discharge oil passage 50 is moved as indicated with a dotted line in FIG. 12 due to vibration of the vehicle or the like so that it is discharged through the air bleeding orifice 144. The on/off valve 146 is equivalent to the orifice switching device. In the meantime, instead of the pilot switching type on/off valve 146, an electromagnetic on/off valve which is opened/closed according to an electric signal can be used and the air bleeding orifice 144 may be connected between the on/off valve 146 and the discharge oil passage 50.

In the present embodiment also, if the discharge pressure Pm is equal to or lower than the predetermined switching pressure, the on/off valve 146 is opened so that air bleeding by the air bleeding orifice 144 is enabled. As a result, generation of air trapping is suppressed and at the same time, air in the discharge oil passage 50 is discharged quickly in the initial period of the startup of the mechanical oil pump 30 thereby improving the rise-up of the discharge pressure Pm. During the normal pump operation in which the discharge pressure Pm is equal to or higher than the predetermined switching pressure, the on/off valve 146 is closed so that the flow-out of the hydraulic oil 40 through, the air bleeding orifice 144 is blocked. Thus, the mechanical oil pump 30 having substantially the same discharge performance as conventionally can be used. That is, while avoiding deterioration in mountability of the mechanical oil pump 30 onto a vehicle and in fuel efficiency due to an increased size thereof and increase of manufacturing cost, the rise-up performance of the discharge pressure Pm can be improved by discharging air through the air bleeding orifice 144.

In the meantime, in the embodiment shown in FIG. 12 also, the air bleeding orifice and the orifice switching device can be provided on the discharge oil passage 52 of the electric oil pump 32 like in each of the above-described embodiments. That is, instead of the relief valve 142, it is permissible to use the relief valves 58, 120, 130 or connect the air bleeding orifice 144 and the on/off valve 146 in parallel to the relief valve 142.

The embodiments of the present invention have been described in detail based on the drawings above. However, they are just examples of the embodiment and the present invention can be modified in various ways based on knowledge of those skilled in the art and carried out according to aspects subjected to improvement.

What is claimed is:

1. A hydraulic circuit for a power transmission device of a vehicle, the hydraulic circuit comprising:
   an oil pump that is a hydraulic pressure source of hydraulic oil, the oil pump configured to actuate a hydraulic actuator of the power transmission device;
   a discharge oil passage configured to communicate with the oil pump;
   a relief valve including a valve body, a spool and an urging member,
   the valve body having a cylindrical hole, an intake port and a discharge port,
   the intake port being provided at an end portion in an axial direction of the cylindrical hole so as to communicate the cylindrical hole with the discharge oil passage,
   the discharge port being provided at an intermediate portion in the axial direction of the cylindrical hole so as to communicate with the cylindrical hole,
   the spool being fitted to the cylindrical hole so as to be moveable in the axial direction within the cylindrical hole in the valve body,
   the spool being configured such that when a discharge pressure in the discharge oil passage reaches a predetermined relief pressure, the spool moves in the axial direction within the cylindrical hole in the valve body then a closed state turns into a relief state, the closed state being a state in which a communication between the intake port and the discharge port is intercepted, the relief state being a state in which hydraulic oil in the discharge oil passage is relieved, the spool being provided with on orifice on it,
   the orifice being provided so as to discharge air from the intake port to the discharge port in the closed state,
   the orifice being configured to limit discharge of air when the spool is retreated up to the relief position,
   the orifice being an annular clearance which is defined between an internal circumferential surface of the cylindrical hole and an external circumferential surface of the spool; and
   an orifice switching device configured to limit an amount of air discharged from the orifice in the relief state compared to the closed state, causing the spool to move toward the discharge port;
   wherein:
   a communication passage for air bleeding is provided between the valve body provided with the intake port and an end portion of the spool so as to communicate the clearance with the intake port in the closed state,
   the communication passage includes an annular groove and a slit,
   the end portion of the spool is a small-diameter portion having a smaller diameter than the other portions of the spool,
   the annular groove is located at an outside of the small-diameter portion in a radial direction,
   the annular groove is continuous with the clearance,
   the annular groove is defined between the cylindrical hole and the spool, and
   the slit is provided on an end face of the small-diameter portion in a direction perpendicular to the axial direction so as to communicate the annular groove with the intake port in the closed state.

2. The hydraulic circuit according to claim 1, wherein hydraulic oil discharged from the orifice together with air is returned to an oil tank directly or through a lubrication portion.

3. The hydraulic circuit according to claim 1, wherein the orifice is disposed above the discharge oil passage so as to communicate with a top portion of the discharge oil passage.

4. The hydraulic circuit according to claim 1, wherein the oil pump is an electric oil pump,
   the hydraulic circuit further comprising:
   a mechanical oil pump configured to be driven by an internal combustion engine that is a driving power source for traveling of the vehicle,
   wherein the discharge oil passage of the electric oil pump is connected to an oil passage communicating with the mechanical oil pump at a connecting point,
   a check valve configured to permit distribution of hydraulic oil to a connecting point side and block the distribution of hydraulic oil to an electric oil pump side, the check valve is disposed on the discharge oil passage between the connecting point and the electric oil pump, and
   the orifice communicates with the discharge oil passage between the electric oil pump and the check valve.

5. A hydraulic circuit for a power transmission device of a vehicle, the hydraulic circuit comprising:
   an oil pump that is a hydraulic pressure source of hydraulic oil, the oil pump configured to actuate a hydraulic actuator of the power transmission device;
   a discharge oil passage configured to communicate with the oil pump;
   a relief valve including a valve body, a spool and an urging member, the valve body having a cylindrical hole, an intake port and a discharge port, the intake port being provided at an end portion in an axial direction of the cylindrical hole so as to communicate the cylindrical hole with the discharge oil passage, the discharge port being provided at an intermediate portion in the axial direction of the cylindrical hole so as to communicate with the cylindrical hole, the spool being fitted to the cylindrical hole so as to be moveable in the axial direction within the cylindrical hole in the valve body, the spool being configured such that when a discharge pressure in the discharge oil passage reaches a predetermined relief pressure, the spool moves in the axial direction within the cylindrical hole in the valve body then a closed state turns into a relief state, the closed state being a state in which a communication between the intake port and the discharge port is intercepted, the relief state being a state in which hydraulic oil in the discharge oil passage is relieved, the spool being provided with on orifice on it, the orifice being provided so as to discharge air from the intake port to the discharge port in the closed state, the orifice being configured to limit discharge of air when the spool is retreated up to the relief position, the orifice being an annular clearance which is defined between an internal circumferential surface of the cylindrical hole and an external circumferential surface of the spool; and an orifice switching device configured to limit an amount of air discharged from the orifice in the relief state compared to the closed state, causing the spool to move toward the discharge port;

wherein:

a communication passage for air bleeding is provided between the valve body provided with the intake port and an end portion of the spool so as to communicate the clearance with the intake port in the closed state, the communication passage includes an annular groove and a protruded row, the end portion of the spool is a small-diameter portion having a smaller diameter than the other portions of the spool, the annular groove is located at an outside of the small-diameter portion in a radial direction, the annular groove is continuous with the clearance, the annular groove is defined between the cylindrical hole and the spool, and the protruded row is provided on an end face of the small-diameter portion such that it intersects with the axial direction so as to communicate the annular groove with the intake port in the closed state.

6. The hydraulic circuit according to claim 5, wherein hydraulic oil discharged from the orifice together with air is returned to an oil tank directly or through a lubrication portion.

7. The hydraulic circuit according to claim 5, wherein the orifice is disposed above the discharge oil passage so as to communicate with a top portion of the discharge oil passage.

8. The hydraulic circuit according to claim 5, wherein the oil pump is an electric oil pump, the hydraulic circuit further comprising:

a mechanical oil pump configured to be driven by an internal combustion engine that is a driving power source for traveling of the vehicle, wherein the discharge oil passage of the electric oil pump is connected to an oil passage communicating with the mechanical oil pump at a connecting point, a check valve configured to permit distribution of hydraulic oil to a connecting point side and block the distribution of hydraulic oil to an electric oil pump side, the check valve is disposed on the discharge oil passage between the connecting point and the electric oil pump, and the orifice communicates with the discharge oil passage between the electric oil pump and the check valve.

* * * * *